US012755339B2

(12) United States Patent
Nakatsugawa

(10) Patent No.: US 12,755,339 B2
(45) Date of Patent: Oct. 6, 2026

(54) RESOLUTION CONVERTER, RESOLUTION CONVERSION METHOD, AND RESOLUTION CONVERSION COMPUTER PROGRAM

(71) Applicant: TOYOTA JIDOSHA KABUSHIKI KAISHA, Toyota (JP)

(72) Inventor: Eiji Nakatsugawa, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 18/375,578

(22) Filed: Oct. 2, 2023

(65) Prior Publication Data

US 2024/0127395 A1 Apr. 18, 2024

(30) Foreign Application Priority Data

Oct. 18, 2022 (JP) ................................ 2022-166872

(51) Int. Cl.
*G06K 9/00* (2022.01)
*G06T 3/4053* (2024.01)
*G06V 10/764* (2022.01)

(52) U.S. Cl.
CPC .......... *G06T 3/4053* (2013.01); *G06V 10/764* (2022.01)

(58) Field of Classification Search
CPC ............................ G06T 3/4053; G06V 10/764
See application file for complete search history.

(56) References Cited

U.S. PATENT DOCUMENTS

| | | | | |
|---|---|---|---|---|
| 2020/0097740 A1 | 3/2020 | Hashimoto et al. | | |
| 2020/0234447 A1 | 7/2020 | Karmatha et al. | | |
| 2021/0183019 A1 | 6/2021 | Uchida et al. | | |
| 2021/0295472 A1 | 9/2021 | Du | | |
| 2023/0128106 A1 * | 4/2023 | Otsuka | A63F 13/35 | 382/299 |

FOREIGN PATENT DOCUMENTS

| | | | |
|---|---|---|---|
| JP | 2020-039851 A | 3/2020 | |
| JP | 2020-052647 A | 4/2020 | |
| JP | 2020-119568 A | 8/2020 | |
| JP | 2020-154562 A | 9/2020 | |
| JP | 2021-157847 A | 10/2021 | |
| WO | WO-2022160980 A1 * | 8/2022 | G06F 18/2415 |

* cited by examiner

*Primary Examiner* — Molly Wilburn
*Assistant Examiner* — Aidan Keup
(74) *Attorney, Agent, or Firm* — Dinsmore & Shohl LLP

(57) ABSTRACT

A resolution converter includes a processor configured to select a super-resolution model corresponding to a capturing condition under which an image was generated, among a plurality of super-resolution models for improving resolution, the plurality of super-resolution models corresponding to different capturing conditions, and generate a high-resolution image having a higher resolution than the image by inputting the image into the selected super-resolution model.

4 Claims, 6 Drawing Sheets

RESOLUTION CONVERTER, RESOLUTION CONVERSION METHOD, AND RESOLUTION CONVERSION COMPUTER PROGRAM

CROSS-REFERENCE TO RELATED APPLICATION

This application claims priority to Japanese Patent Application No. 2022-166872 filed on Oct. 18, 2022, the entire contents of which are herein incorporated by reference.

FIELD

The present disclosure relates to a resolution converter, a resolution conversion method, and a resolution conversion computer program for converting the resolution of an image.

BACKGROUND

A technique to convert the resolution of an image has been proposed (see Japanese Unexamined Patent Publication JP2020-154562A).

An information processor disclosed in JP2020-154562A converts an inputted image into a low-resolution image having a lower predetermined resolution than the inputted image, and classifies the low-resolution image into any of a number of categories, using a category classification model that has learned categories to which images belong. In addition, the information processor generates low-resolution masking data for the low-resolution image from a masking model corresponding to the category among masking models that have been trained with low-resolution masking data of respective categories having the predetermined resolution. The resolution converter converts the generated low-resolution masking data into high-resolution masking data, using a super-resolution model that has been trained with high-resolution masking data having a resolution at least higher than the predetermined resolution and corresponding to the low-resolution masking data.

SUMMARY

When images to be subjected to a resolution enhancement process are collected, the images may be compressed using an irreversible data compression method to reduce the amount of image data. In such a case, the resolution of objects represented in the images to be subjected to the resolution enhancement process is lower than that in original images, i.e., images before data compression. It is therefore desirable to increase the resolution of images appropriately so that the resolution of objects represented in the images may be improved.

It is an object of the present disclosure to provide a resolution converter that can increase the resolution of an image appropriately.

According to an embodiment, a resolution converter is provided. The resolution converter includes a processor configured to: select a super-resolution model corresponding to a capturing condition under which an image was generated, among a plurality of super-resolution models for improving resolution, the plurality of super-resolution models corresponding to different capturing conditions, and generate a high-resolution image having a higher resolution than the image by inputting the image into the selected super-resolution model.

In some embodiments, the image includes condition information indicating the capturing condition under which the image was generated; and the processor of the resolution converter selects the super-resolution model corresponding to the capturing condition indicated by the condition information among the plurality of super-resolution models.

In some embodiments, the processor of the resolution converter selects the super-resolution model corresponding to the capturing condition under which the image was generated, by inputting the image into a classifier for classification into the capturing conditions corresponding to the plurality of super-resolution models.

According to another embodiment, a resolution conversion method is provided. The resolution conversion method includes selecting a super-resolution model corresponding to a capturing condition under which an image was generated, among a plurality of super-resolution models for improving resolution of the image, the plurality of super-resolution models corresponding to different capturing conditions; and generating a high-resolution image having a higher resolution than the image by inputting the image into the selected super-resolution model.

According to still another embodiment, a non-transitory recording medium that stores a resolution conversion computer program is provided. The resolution conversion computer program includes instructions causing a computer to execute a process including selecting a super-resolution model corresponding to a capturing condition under which an image was generated, among a plurality of super-resolution models for improving resolution of the image, the plurality of super-resolution models corresponding to different capturing conditions; and generating a high-resolution image having a higher resolution than the image by inputting the image into the selected super-resolution model.

The resolution converter according to the present disclosure has an effect of being able to increase the resolution of an image appropriately.

DESCRIPTION OF EMBODIMENTS

A resolution converter, a resolution conversion method executed by the resolution converter, and a resolution conversion computer program will now be described with reference to the attached drawings. From a plurality of super-resolution models for improving the resolution of an image, the resolution converter selects a super-resolution model corresponding to a capturing condition under which an image whose resolution is to be converted was generated. The super-resolution models are configured to correspond to different capturing conditions. The resolution converter generates a high-resolution image having a higher resolution than the image by inputting the image into the selected super-resolution model.

The following describes an example in which the resolution converter is applied to an image collection system that collects images generated by a camera mounted on a vehicle. In this example, the resolution converter generates high-resolution images having a higher resolution than collected images to generate training data used for training a classifier for object detection or a classifier for semantic segmentation. In this way, for example, details of an object blurred in a collected image are artificially restored in a high-resolution image, which makes the object clearly visible. However, the resolution converter according to the present disclosure may be applied not only to this example, but also to various applications in which it is desirable to generate high-resolution images having a higher resolution than images to be subjected to the resolution conversion process.

Figure 1:
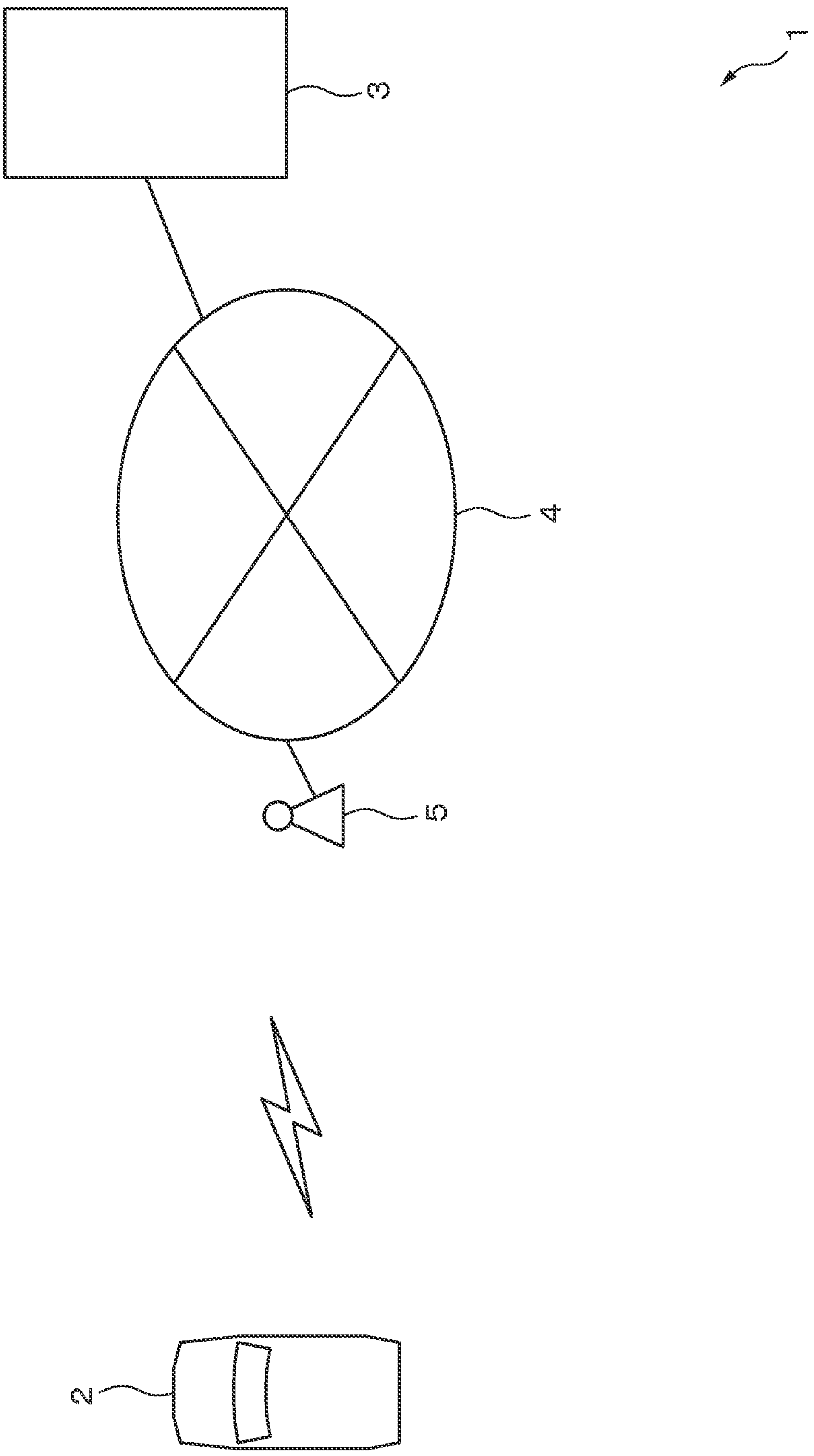
FIG. 1 schematically illustrates the configuration of an image collection system equipped with a resolution converter.

FIG. 1 schematically illustrates the configuration of an image collection system equipped with the resolution converter. In the present embodiment, the image collection system 1 includes at least one vehicle 2 and a server 3, which is an example of the resolution converter. Each vehicle 2 accesses a wireless base station 5, which is connected via a gateway (not illustrated) to a communication network 4 connected with the server 3, thereby connecting to the server 3 via the wireless base station 5 and the communication network 4, for example. For simplicity, FIG. 1 illustrates only a single vehicle 2, but the image collection system 1 may include multiple vehicles 2. FIG. 1 also illustrates only a single wireless base station 5, but the communication network 4 may be connected with multiple wireless base stations 5.

Figure 2:
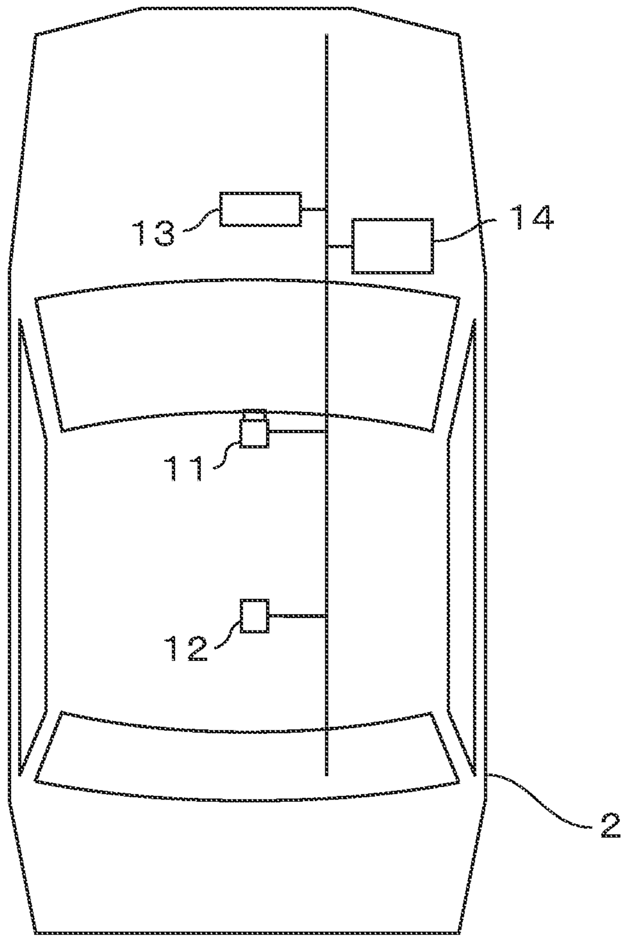
FIG. 2 schematically illustrates the configuration of a vehicle.

FIG. 2 schematically illustrates the configuration of the vehicle 2. The vehicle 2 includes a camera 11, a GPS receiver 12, a wireless communication terminal 13, and a data acquisition device 14, which are communicably connected via an in-vehicle network conforming to a standard such as a controller area network.

The camera 11, which is an example of an image capturing unit for taking pictures of the surroundings of the vehicle 2, includes a two-dimensional detector constructed from an array of optoelectronic transducers, such as CCD or C-MOS, having sensitivity to visible light and a focusing optical system that forms an image of a target region on the two-dimensional detector. The camera 11 is mounted in the interior of the vehicle 2 so as to be oriented, for example, to the front of the vehicle 2. The camera 11 takes pictures of a region in front of the vehicle 2 every predetermined capturing period (e.g., 1/30 to 1/10 seconds), and generates images representing the region. Each image obtained by the camera 11 may be a color or grayscale image. The vehicle 2 may include multiple cameras taking pictures in different orientations or having different focal lengths.

Every time an image is generated, the camera 11 outputs the generated image to the data acquisition device 14 via the in-vehicle network.

The GPS receiver 12 receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 14 via the in-vehicle network at predetermined intervals. Instead of the GPS receiver 12, the vehicle 2 may include a receiver conforming to another satellite positioning system. In this case, the receiver determines the position of the vehicle 2.

The wireless communication terminal 13, which is an example of a communication unit, is a device to execute a wireless communication process conforming to a predetermined standard of wireless communication, and accesses, for example, the wireless base station 5 to connect to the server 3 via the wireless base station 5 and the communication network 4. The wireless communication terminal 13 generates an uplink radio signal including image data received from the data acquisition device 14, and transmits the uplink radio signal to the wireless base station 5 to transmit the image data to the server 3.

The data acquisition device 14 temporarily stores images generated by the camera 11 and transmits an image satisfying a predetermined condition among the stored images to the server 3 via the wireless communication terminal 13. In the following, an image to be transmitted to the server 3 will be referred to as a "transmission target image."

For example, the data acquisition device 14 determines a series of images generated by the camera 11 at timing when notified by an electronic control unit (ECU, not illustrated) for controlling travel of the vehicle 2 that the deceleration of the vehicle 2 has exceeded a predetermined threshold and in a predetermined period before and after the timing, as transmission target images. Alternatively, the data acquisition device 14 may determine images generated by the camera 11 while the position of the vehicle 2 determined by the GPS receiver 12 is within a predetermined collection target region, as transmission target images.

In each transmission target image, the data acquisition device 14 includes condition information indicating a capturing condition under which the transmission target image was generated, as metadata. The condition information includes, for example, at least one of the following: the date and time of generation of the transmission target image, the position of the vehicle 2 at the time of generation of the image, and weather information indicating weather around the vehicle 2 at the time of generation of the image. The position of the vehicle 2 at the time of generation of a transmission target image is determined by the GPS receiver 12. The weather information is obtained, for example, from a weather server (not illustrated) via the wireless communication terminal 13.

In addition, the data acquisition device 14 may compress the transmission target images in accordance with a predetermined image compression method to reduce the amount of data of the transmission target images. The predetermined image compression method may be an irreversible or reversible compression method, e.g., JPEG or EXIF.

The data acquisition device 14 transmits image data including transmission target images and related condition information to the server 3 via the wireless communication terminal 13 at predetermined timing. The predetermined timing may be, for example, a preset time or timing at which an ignition switch of the vehicle 2 is turned off. Alternatively, the predetermined timing may be timing at which the amount of data of transmission target images that are stored in the data acquisition device 14 and that have not been transmitted to the server 3 reaches a predetermined upper limit.

Figure 3:
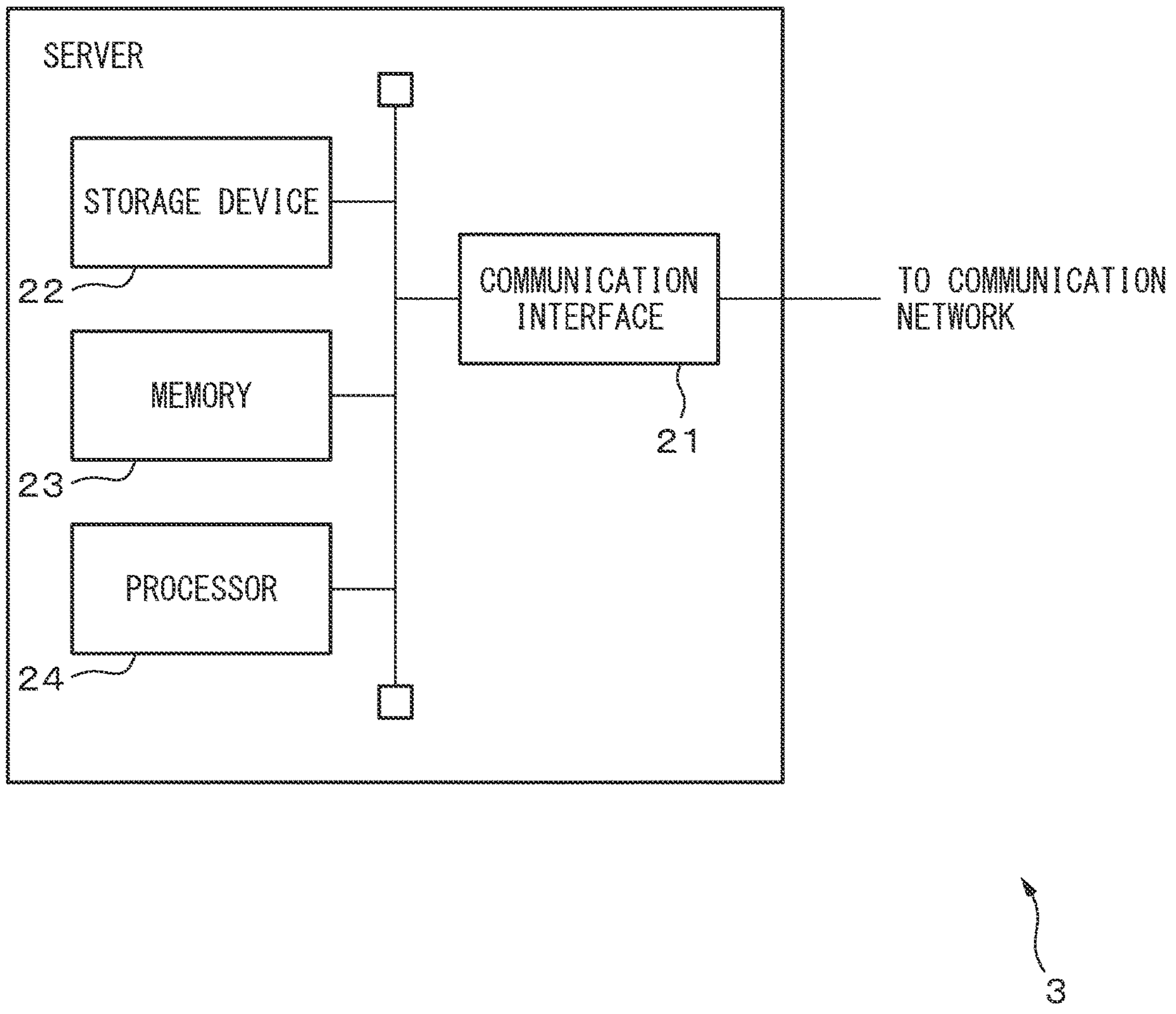
FIG. 3 illustrates the hardware configuration of a server, which is an example of the resolution converter.

The following describes the server 3, which is an example of the resolution converter. FIG. 3 illustrates the hardware configuration of the server 3, which is an example of the resolution converter. The server 3 includes a communication interface 21, a storage device 22, a memory 23, and a processor 24. The communication interface 21, the storage device 22, and the memory 23 are connected to the processor 24 via a signal line. The server 3 may further include an input device, such as a keyboard and a mouse, and a display device, such as a liquid crystal display.

The communication interface 21, which is an example of a communication unit, includes an interface circuit for connecting the server 3 to the communication network 4. The communication interface 21 is configured to be communicable with the vehicle 2 via the communication network 4 and the wireless base station 5. More specifically, the communication interface 21 passes image data received from the vehicle 2 via the wireless base station 5 and the communication network 4 to the processor 24.

The storage device 22, which is an example of a storage unit, includes, for example, a hard disk drive, or an optical medium and an access device therefor, and stores various types of data and information used in the resolution conversion process. For example, the storage device 22 stores image data received from the vehicle 2 and, for each of super-resolution models, a set of parameters for specifying the super-resolution model. The super-resolution models are associated with different capturing conditions and used for improving the resolution of an image obtained under the corresponding capturing condition. The storage device 22 further stores information for categorizing capturing conditions (e.g., the time of the boundary between daytime and nighttime of each day and map information representing geographical area of each country). Alternatively, the storage device 22 may store a set of parameters for specifying a classifier used for classifying images whose resolution is to be converted. The storage device 22 may further store a computer program for the resolution conversion process executed by the processor 24 and generated high-resolution images.

The memory 23, which is another example of a storage unit, includes, for example, nonvolatile and volatile semiconductor memories. The memory 23 temporarily stores various types of data generated during execution of the resolution conversion process.

The processor 24, which is an example of a control unit, includes one or more central processing units (CPUs) and a peripheral circuit thereof. The processor 24 may further include another operating circuit, such as a logic-arithmetic unit or an arithmetic unit. The processor 24 executes the resolution conversion process.

Figure 4:
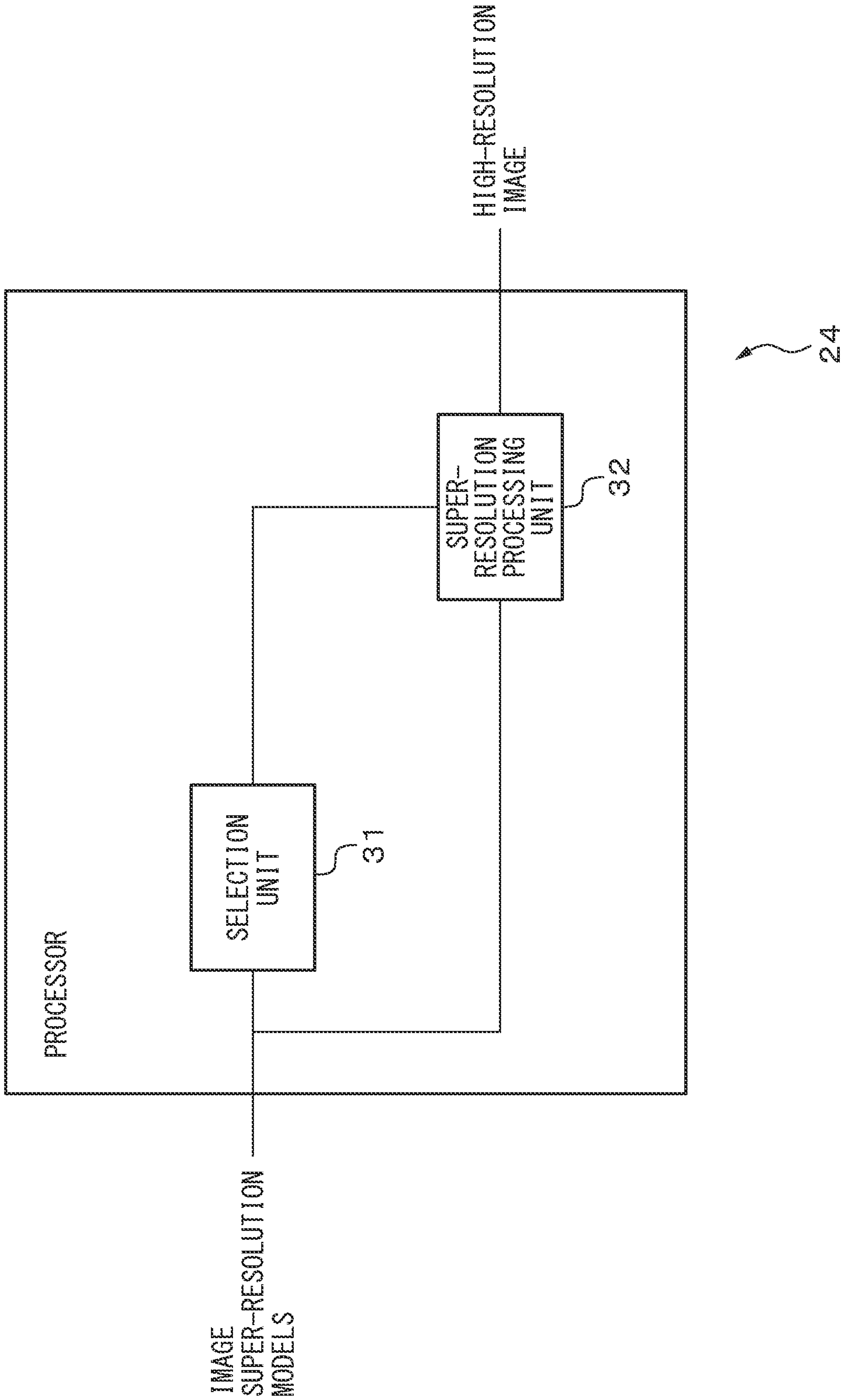
FIG. 4 is a functional block diagram of a processor of the server, related to a resolution conversion process.

FIG. 4 is a functional block diagram of the processor 24, related to the resolution conversion process. The processor 24 includes a selection unit 31 and a super-resolution processing unit 32. These units included in the processor 24 are functional modules, for example, implemented by a computer program executed by the processor 24, or may be dedicated operating circuits provided in the processor 24. For each piece of image data, the processor 24 executes the resolution conversion process on an image included in the image data.

The selection unit 31 selects a super-resolution model corresponding to a capturing condition under which an image to be subjected to the resolution conversion process was generated, from super-resolution models.

Each of the super-resolution models is configured to output a high-resolution image having a higher resolution than an inputted image. The super-resolution models may have the same architecture, or all or some of the super-resolution models may have different architectures. For example, each of the super-resolution models may be configured as a "deep neural network (DNN)." More specifically, each of the super-resolution models may be, for example, a DNN having architecture of a convolutional neural network (CNN) type, such as Enhanced deep residual networks for single image super-resolution (EDSR) or SRResNet. Alternatively, all or some of the super-resolution models may be DNNs using attention, such as RCAN, or models other than a DNN. These super-resolution models correspond to different capturing conditions. Each of the super-resolution models is trained in advance in accordance with a predetermined training technique, such as backpropagation, with training images obtained under a capturing condition corresponding to the super-resolution model. Thus these super-resolution models can generate and output a high-resolution image in which the resolution of an object represented in an image obtained under a corresponding capturing condition is improved.

In the present embodiment, capturing conditions are categorized according to temporal conditions. In this case, capturing conditions are categorized, for example, into daytime and nighttime. This enables preparing super-resolution models so as to appropriately increase the resolution of features of outward appearance of an object that look different in the daytime and nighttime. Alternatively, capturing conditions may be categorized according to geographical conditions at the times of generation of images. In this case, capturing conditions are categorized, for example, by country, such as Japan, the United States of America, and Germany. This enables preparing super-resolution models so as to appropriately increase the resolution of an object with letters or characters, which differ from country to country. In addition, capturing conditions may be categorized according to weather at the times of generation of images. In this case, capturing conditions may be categorized, for example, into rain or snow and the other weather. This enables preparation of super-resolution models so as to appropriately increase the resolution of features of outward appearance of an object that look different in the rain or snow and the other weather. Further, capturing conditions may be categorized according to a combination of at least two of the following: temporal conditions, geographical conditions, and weather.

The selection unit 31 refers to condition information included in an image, and selects a super-resolution model corresponding to a capturing condition indicated by the condition information from the super-resolution models. This enables the selection unit 31 to appropriately select a super-resolution model corresponding to the capturing condition under which the image was generated.

For example, when the date and time of generation of an image is included in the image as condition information, the selection unit 31 determines whether the date and time of generation is in the daytime or nighttime. The selection unit 31 selects a super-resolution model corresponding to daytime, when the date and time of generation of the image is in the daytime, and selects a super-resolution model corresponding to nighttime, when the date and time of generation of the image is in the nighttime.

When the position of the vehicle 2 at the time of generation of an image is included in the image as condition information, the selection unit 31 identifies the country where the vehicle 2 was at the time of generation of the image, by referring to the position of the vehicle 2 and map information. The selection unit 31 then selects a super-resolution model corresponding to the identified country.

Alternatively, when weather information is included in an image as condition information, the selection unit 31 selects a super-resolution model corresponding to weather indicated by the weather information.

According to a modified example, the selection unit 31 may select a super-resolution model corresponding to a capturing condition under which an image was generated, by inputting the image into a classifier for classification into the capturing conditions corresponding to the super-resolution models. As such a classifier, the selection unit 31 can use a DNN having architecture of a CNN type. Alternatively, the classifier may be configured in accordance with another technique used for classifying images. In this way, capturing conditions are categorized more appropriately according to information represented in images. Thus the selection unit 31 can appropriately select a super-resolution model corresponding to a capturing condition under which an image was generated.

In this example, the classifier is trained in advance in accordance with a predetermined training technique with a large number of training images obtained under various capturing conditions, thereby being configured to classify an image as one of the capturing conditions. For each class of capturing conditions, a corresponding super-resolution model is prepared.

According to another modified example, a feature distribution that is the distribution of feature vectors of images may be prestored in the storage device 22 for each of the capturing conditions. A feature vector includes, for example, element values indicating features of an image, such as an average and a variance of luminance or each color and contrast of the image. A feature distribution may be, for example, a normal distribution having a dimension depending on the number of element values included in a feature vector. In this case, the selection unit 31 calculates a feature vector of an image, and calculates a Mahalanobis distance between the feature vector and the feature distribution for each capturing condition. The selection unit 31 then selects a super-resolution model corresponding to a capturing condition that makes the Mahalanobis distance the shortest.

The selection unit 31 notifies the super-resolution processing unit 32 of the selected super-resolution model.

The super-resolution processing unit 32 inputs the image into the super-resolution model selected by the selection unit 31 to generate a high-resolution image having a higher resolution than the inputted image. This produces a high-resolution image having a resolution, for example, several times as high as that of the image inputted into the super-resolution model in both the horizontal and vertical directions.

Figure 5:
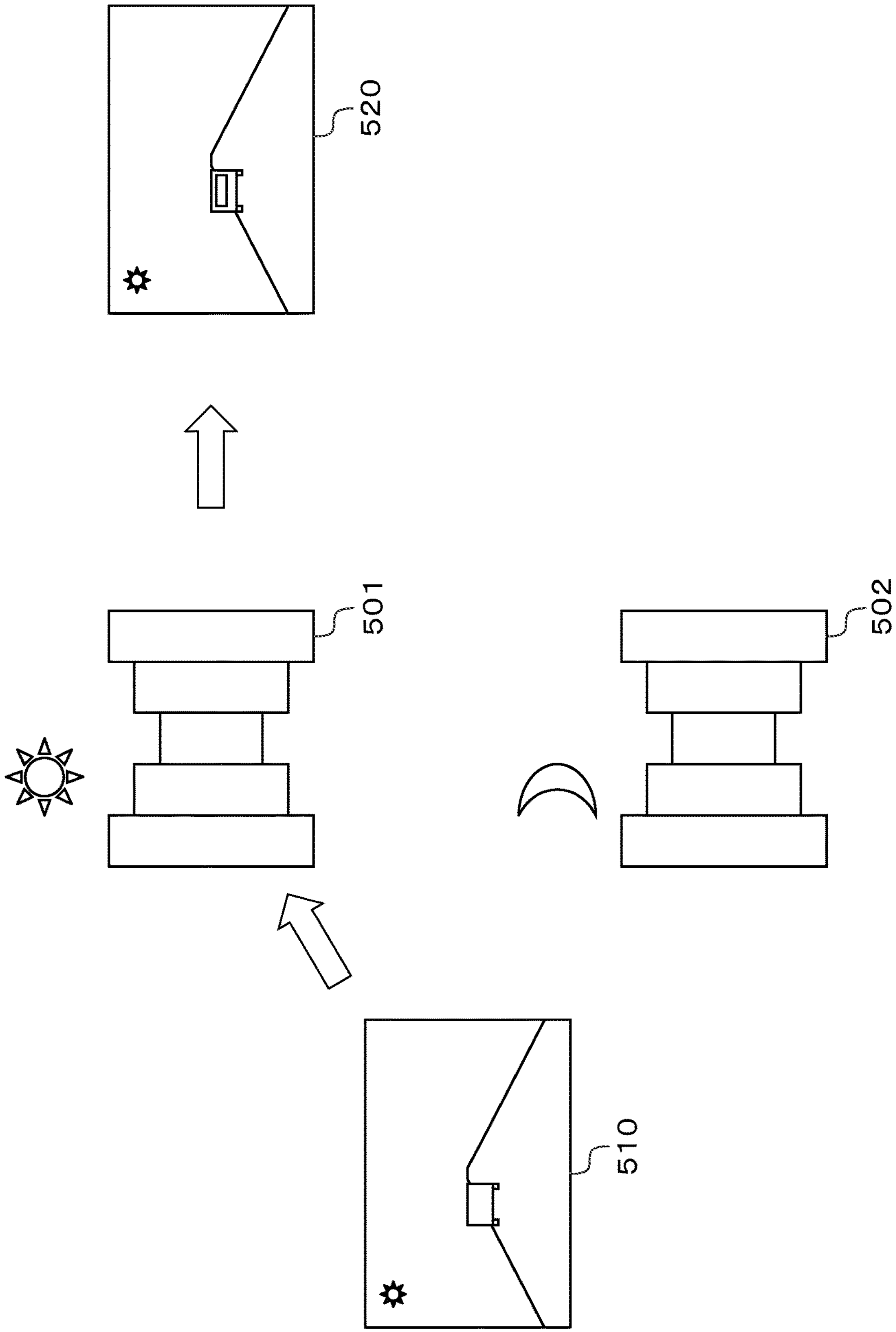
FIG. 5 is a schematic diagram for explaining the resolution conversion process.

FIG. 5 is a schematic diagram for explaining the resolution conversion process according to the present embodiment. In this example, super-resolution models 501 and 502 respectively corresponding to daytime and nighttime, which are capturing conditions, are prepared as super-resolution models. For an image 510 whose resolution is to be increased, the time of generation of the image 510, which is in the daytime, is included as condition information. Hence the super-resolution model 501 for daytime is selected among the super-resolution models 501 and 502. Inputting the image 510 into the selected super-resolution model 501 produces a high-resolution image 520. In this way, the use of the super-resolution model corresponding to the capturing condition under which the image 510 was generated produces an appropriate high-resolution image 520.

Figure 6:
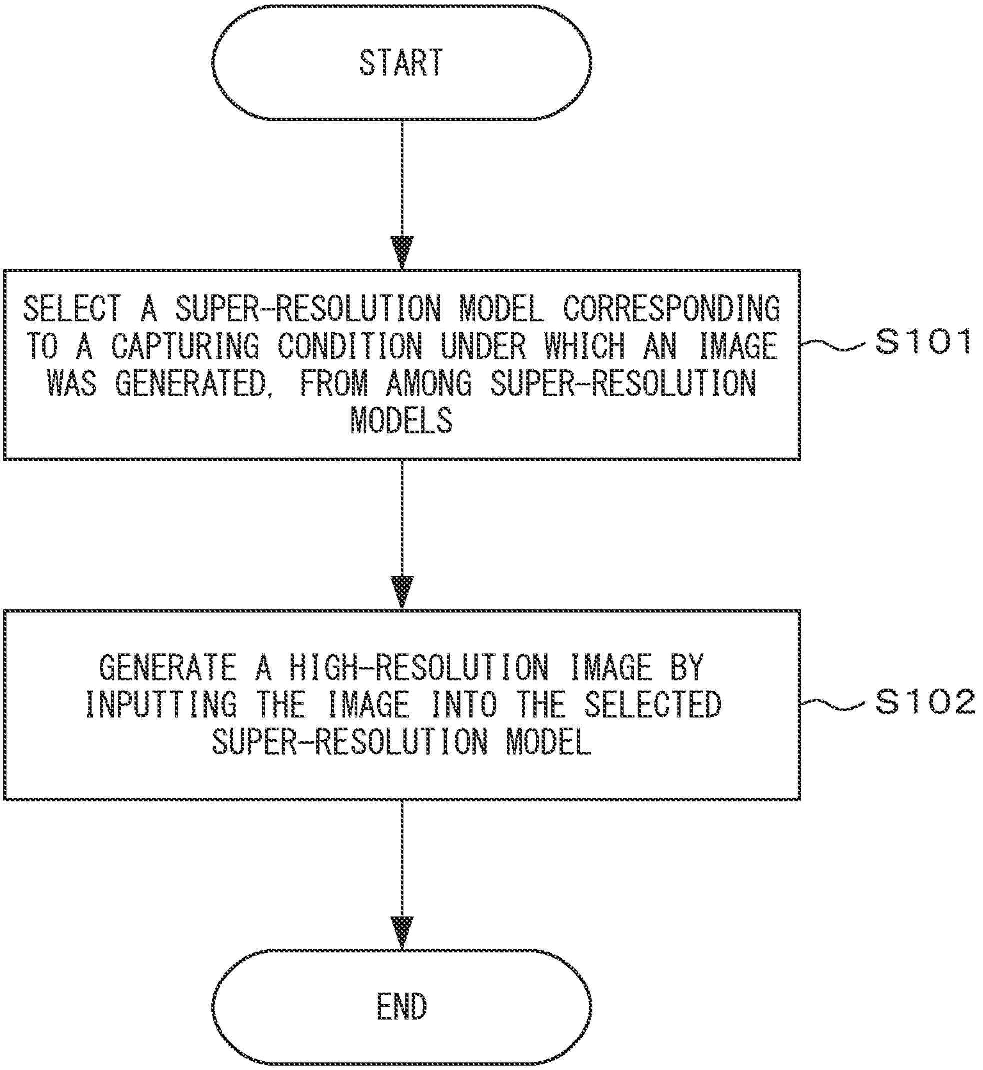
FIG. 6 is an operation flowchart of the resolution conversion process.

FIG. 6 is an operation flowchart of the resolution conversion process executed by the server 3. The processor 24 of the server 3 executes the resolution conversion process in accordance with the operation flowchart described below for each target image.

The selection unit 31 of the processor 24 selects a super-resolution model corresponding to a capturing condition under which an image to be subjected to the resolution conversion process was generated, from super-resolution models (step S101). The super-resolution processing unit 32 of the processor 24 inputs the image into the selected super-resolution model to generate a high-resolution image having a higher resolution than the inputted image (step S102). The processor 24 then terminates the resolution conversion process.

As has been described above, from super-resolution models for improving the resolution of an image, the resolution converter selects a super-resolution model corresponding to a capturing condition under which an image whose resolution is to be converted was generated. The super-resolution models are configured to correspond to different capturing conditions. The resolution converter generates a high-resolution image having a higher resolution than the image by inputting the image into the selected super-resolution model. By generating a high-resolution image in this way, the resolution converter can increase the resolution of an image appropriately so that the resolution of an object represented in the image may be artificially improved. Thus, even if some of information represented in an image is lost by irreversibly compressing the image, the resolution converter can artificially restore information represented in the image.

The computer program for causing a computer to achieve the functions of the units included in the processor of the resolution converter according to the embodiment or modified examples may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present disclosure.

What is claimed is:

1. A resolution converter comprising:

a memory configured to store a plurality of distributions of feature vectors corresponding to different capturing conditions, and a processor configured to:

select a super-resolution model corresponding to a capturing condition under which an image was generated, among a plurality of super-resolution models for improving resolution, the plurality of super-resolution models corresponding to different capturing conditions, generate a high-resolution image having a higher resolution than the image by inputting the image into the selected super-resolution model, wherein the capturing condition comprises one or more of a date and time of generation of the image, a position of a vehicle at the time of generation of the image, and weather information indicating weather around the vehicle at the time of generation of the image, calculate a feature vector of the image, calculate, for each of the plurality of distributions of feature vectors, Mahalonobis distance between the feature vector and the distribution of feature vectors, and select a super-resolution model corresponding to a capturing condition corresponding to a distribution of feature vectors having the shortest Mahalonobis distance, among the plurality of super-resolution models, as the super-resolution model corresponding to the capturing condition under which the image was generated.

2. The resolution converter according to claim 1, wherein the image includes condition information indicating the capturing condition under which the image was generated, and the processor selects the super-resolution model corresponding to the capturing condition indicated by the condition information among the plurality of super-resolution models.

3. A resolution conversion method, comprising:

selecting a super-resolution model corresponding to a capturing condition under which an image was generated, among a plurality of super-resolution models for improving resolution of the image, the plurality of super-resolution models corresponding to different capturing conditions;

generating a high-resolution image having a higher resolution than the image by inputting the image into the selected super-resolution model, wherein the capturing condition comprises one or more of a date and time of generation of the image, a position of a vehicle at the time of generation of the image, and weather information indicating weather around the vehicle at the time of generation of the image;

calculating a feature vector of the image;

calculating, for each of the plurality of distributions of feature vectors, Mahalonobis distance between the feature vector and the distribution of feature vectors; and selecting a super-resolution model corresponding to a capturing condition corresponding to a distribution of feature vectors having the shortest Mahalonobis distance, among the plurality of super-resolution models, as the super-resolution model corresponding to the capturing condition under which the image was generated.

4. A non-transitory recording medium that stores a resolution conversion computer program, the computer program causing a computer to execute a process comprising:

selecting a super-resolution model corresponding to a capturing condition under which an image was generated, among a plurality of super-resolution models for improving resolution of the image, the plurality of super-resolution models corresponding to different capturing conditions;

generating a high-resolution image having a higher resolution than the image by inputting the image into the selected super-resolution model, wherein the capturing condition comprises one or more of a date and time of generation of the image, a position of a vehicle at the time of generation of the image, and weather information indicating weather around the vehicle at the time of generation of the image;

calculating a feature vector of the image;

calculating, for each of the plurality of distributions of feature vectors, Mahalonobis distance between the feature vector and the distribution of feature vectors; and selecting a super-resolution model corresponding to a capturing condition corresponding to a distribution of feature vectors having the shortest Mahalonobis distance, among the plurality of super-resolution models, as the super-resolution model corresponding to the capturing condition under which the image was generated.

* * * * *